United States Patent Office 3,508,260
Patented Apr. 21, 1970

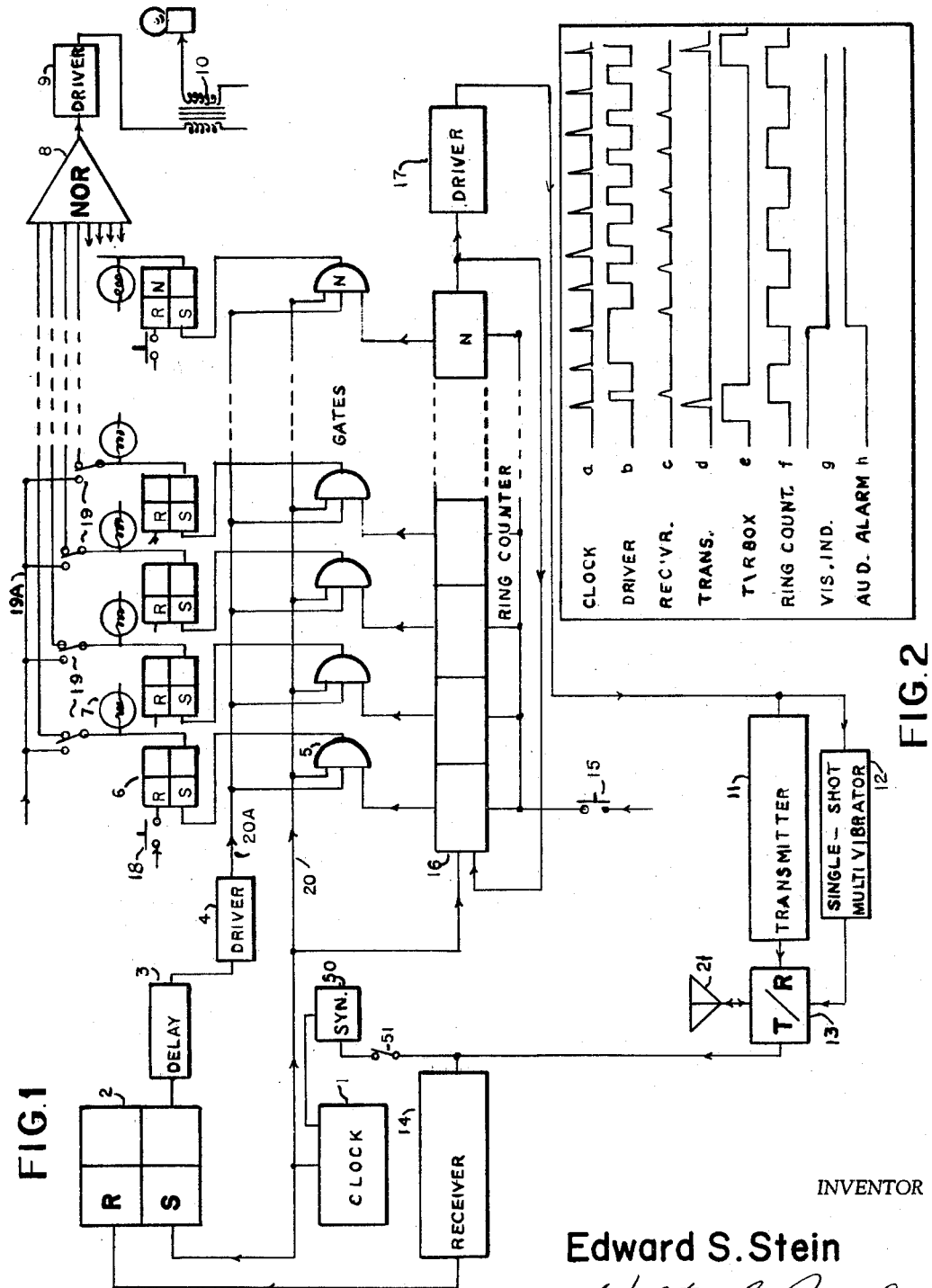

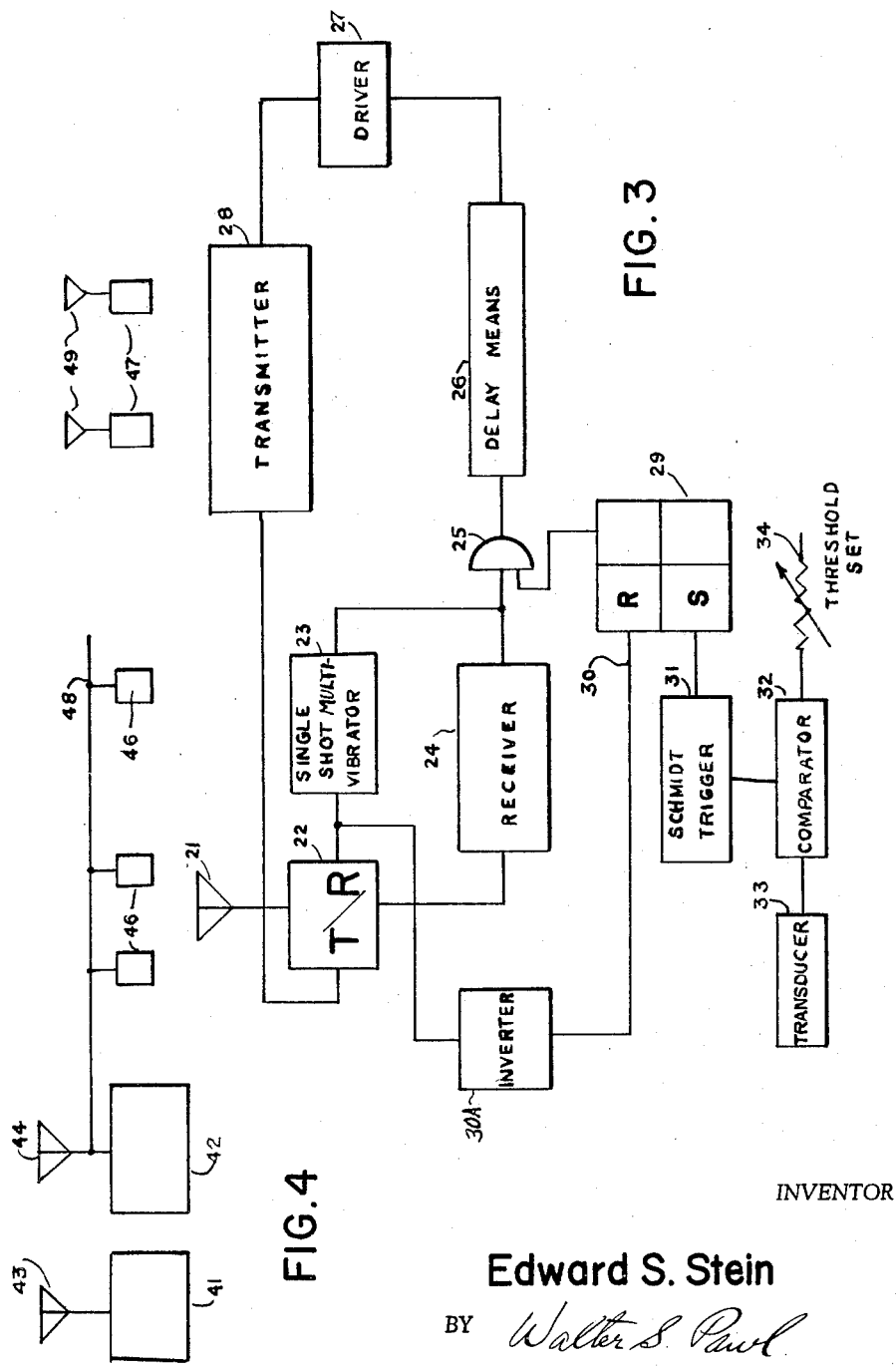

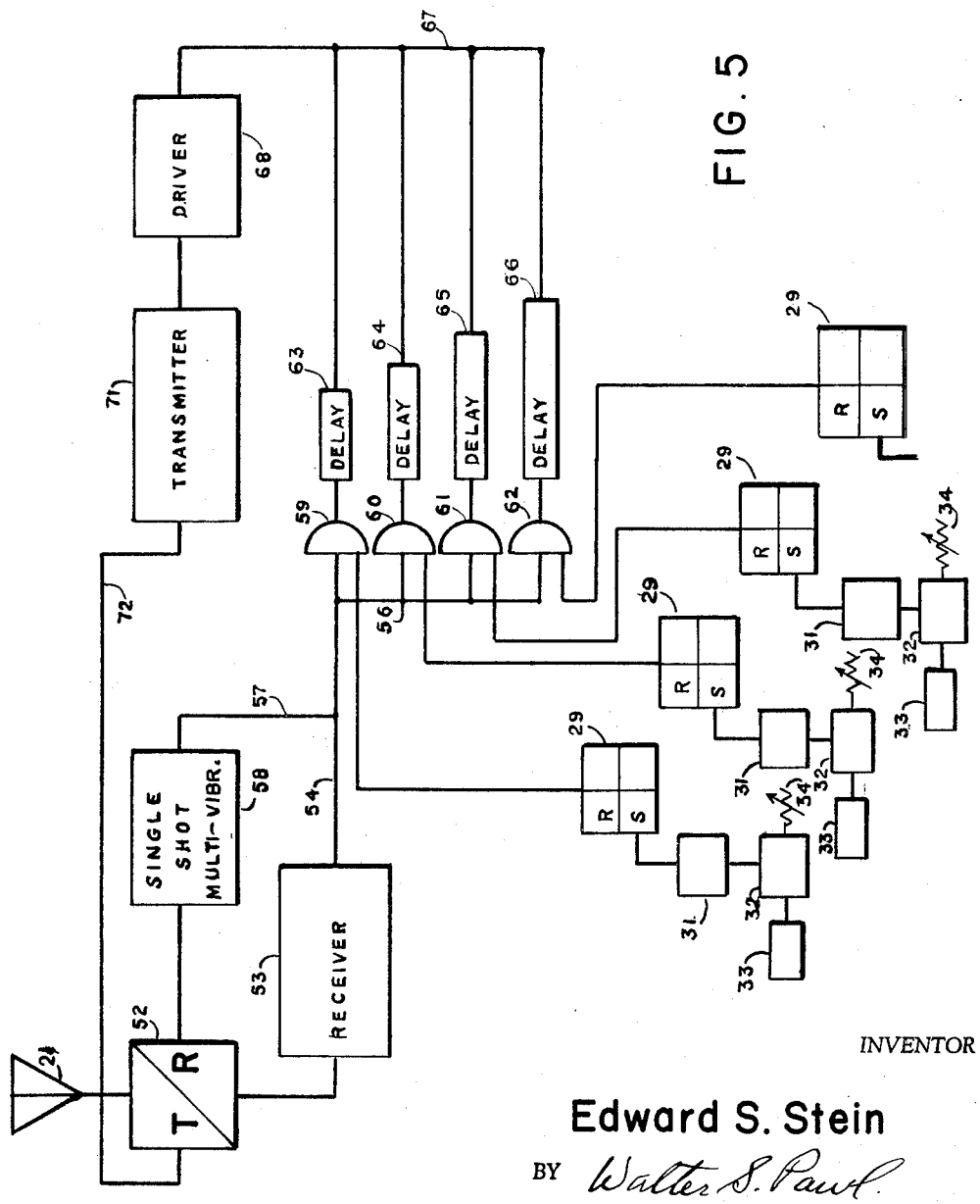

3,508,260
TRANSPONDER MONITORING SYSTEM
Edward S. Stein, 5717 Nevada Ave.,
Washington, D.C. 20015
Filed Sept. 3, 1968, Ser. No. 757,048
Int. Cl. G01s 9/56
U.S. Cl. 343—6.5                                    10 Claims

ABSTRACT OF THE DISCLOSURE

A monitoring system comprising a monitoring station having a transmitter to transmit regularly occurring triggering pulses, a receiver to receive response pulses, and lamps to separately indicate whether or not said response pulses are received or not; and a plurality of responder stations each having a receiver for receiving said triggering pulses, a transmitter for transmitting response pulses, delay lines for delaying the transmission of the response pulses to a predetermined time interval different from those at each of the other responder stations, and "AND" gates responsive to a condition under surveillance to interrupt the transmission of said response pulses when the condition reaches an abnormal state.

---

The present invention relates to a system for monitoring a plurality of responder stations, at which a condition or plurality of conditions may or may not exist. Such a system is applicable to the surveillance of industrial complexes, banks, offices, homes and the like, whereas for example the presence of an intruder, the presence of a fire or smoke, or high water and the like is to be detected. The system is also applicable to seagoing vessels and to aircraft wherein there are confined spaces which must be maintained under constant surveillance for smoke and fire. The invention is also applicable in hospitals and nursing homes where there are a large number of patients and it is desired that an indication of their condition as represented by temperature respiration rate and pulse be conveyed to a central position such as the nurses station. There is no limit to the number of applications for the invention.

Prior systems used in the surveillance field have not been completely satisfactory from many standpoints. Those which have been designed to detect and indicate the presence of intruders have been subject to being rigged to give false reports thus rendering the system ineffective. They are less reliable than they should be because of a lack of provisions for indicating a malfunction of the apparatus. Still other systems require an exorbitant outlay of cash to install, maintain and expand. Still other systems of similar character and purpose have the drawback of being wasteful of the frequency bands allocated for such service or require redundant wiring schemes to provide service for different locations and different alarm conditions.

My system inherently includes features which render the system substantially tamperproof, which will indicate a failure or malfunction of the system and its components, and which will be inexpensive to install, maintain and expand.

It is an object of the invention to provide a system of the character described that will be inexpensive to construct install and maintain.

It is another object of the invention to provide a system which is comparatively foolproof and tamperproof.

Still another object is to provide a system that includes a fail safe feature that will cause indication of an abnormality upon the failure or malfunction of the system or components thereof.

Another object is to provide a system that permits expansion and enlargement without excessive costs, major alterations of the system and without requiring a wider frequency band for operation.

Still another object is to provide a system which may utilize a system of electrical conductors or wireless means or a combination of both in a system for the transmission of signals, as for example, where it is desired to provide an indication at a point or plurality of points either near or far from the conditions under surveillance.

Other objects and advantages of the invention will become obvious from consideration of the specification and the accompanying drawings, in which:

FIGURE 1 is a schematic diagram of the monitoring station used in the monitoring system;

FIGURE 2 is a chart showing the time relation of the energy pulses in the various portions of the monitoring station to assist in the disclosure of its mode of operation;

FIGURE 3 is a schematic diagram of the responder station utilized in the system;

FIGURE 4 is a schematic diagram of the system using electrical conductors as well as wireless means for connecting the responder stations to the monitoring station and also in which more than one monitoring station may be used to receive pulses from the responder stations and produce an indication of one or more conditions; and FIGURE 5 is a schematic diagram of a modification of the responder station, providing for the production of a plurality of response pulses from a single responder station for indicating the state of a plurality of conditions at a single responder station.

In general terms the invention comprises a system consisting of a station or stations called monitoring station, which will transmit over a system of electrical conductors or by wireless means or both, a series of equally spaced triggering pulses of energy and a plurality of responder stations, which will receive said triggering pulses and make a response thereto or not depending upon the state of the condition that is to be kept under surveillance.

The monitoring station sends out the triggering pulses and the responder stations receive said pulses. The response of the responder station is controlled by a gating means, which in turn is under the control of a transducer that responds to the state of the condition under surveillance. There may be a plurality of responder stations, one each for each condition that is kept under surveillance or other may be plurality of gate means and transducers for each responder station whereby a plurality of conditions may be kept under surveillance and all indicated at the monitoring station or stations. The system is arranged so that the responder station would make a response to each triggering pulse for each normal state of the conditions under surveillance by sending out a reply pulse. When an abnormality state of any condition exists at the responder station, the responder station is prevented from making a response for that condition and thus indicate the need for attention.

For the purpose of identification of the pulses with their stations and with the condition under surveillance and for orderly reception of the pulses, the responder stations are made to respond in sequence, each station transmitting either one pulse for each or a plurality of conditions kept under surveillance, or as in a modification, the responder station is made to respond to a plurality of conditions by sending out a separate pulse for each condition. In the system, each condition kept under surveillance is allocated a separate time slot for response whether there is a single or plurality of conditions at each responder station. These time slots are time spaced in accordance with a delay associated with the responder stations in reporting on the conditions kept under surveillance. Each time slot is assigned a separate indicating channel or circuit and these circuits are conditioned by a commutating means to be controlled in accordance with the reception or nonreception of the reply pulses in the respective time slots.

The indicating means consists of a plurality of visual means one for each circuit or channel which in this example are normally energized, and a single audio alarm normally de-energized but which is energized by any or all of the circuits when an abnormality occurs. The visual indicator is de-energized upon the occurrence of an abnormal state of a condition.

In the system provided with a plurality of monitoring stations capable of alternately or simultaneously providing indication of normal or abnormal states of conditions, a further means is provided for selectively operating any monitoring station and for operating them in synchronism. This same means provides for operating one monitoring station as a master station and the other monitoring stations as slave stations.

For a more specific disclosure of the invention reference is made to FIGURE 1 of the drawing, wherein is schematically disclosed a monitoring station having a transmitter 11 for emitting a series of regularly spaced triggering energy pulses. For performing this function the monitoring station comprises a clock 1 which operates, for example to produce kilocycle pulses. The clock 1 is connected to the input of a commutator device, for example a ring counter 16, causing it to be sequentially stepped through its range of steps 1 through $n$ inclusive, at the rate of one step per clock pulse. When the ring counter 16 has been stepped to its $n$th step, it produces an output in a feedback circuit to recycle the counter and also to produce a pulse at the input of the driver 17, shown connected to the counter 16. The output of the driver 17 is fed to the input of the transmitter 11 and thereby causes it to emit a radio frequency pulse to the transmit-receive box 13, called T/R box. At this moment the T/R box 13 connects the transmitter to the antenna 21 and the transmitter triggering pulse passes to the antenna and then to the antennas of the responder stations.

Also connected to the output of the driver 17 is a single shot multivibrator 12 that operates to control the T/R box 13 alternately to connect the transmitter 11 and the receiver 14 to the antenna. The T/R box 13 is normally in a state that it connects the receiver 14 to the antenna, and isolates the transmitter therefrom. The one shot multivibrator produces an output to the T/R box 13 which causes it to be switched to its transmit position and at that time isolates the receiver from the antenna for a period necessary to permit the transmitter pulse to pass to the antenna. After the triggering pulse is transmitted the multivibrator 12 returns to its previous state to re-establish a connection between the receiver and the antenna and to isolate the transmitter therefrom.

The radio frequency triggering pulse is thus transmitted to the antenna and through space to the plurality of responder stations dispersed over the area covered by the system.

In the present example of the invention, the clock produces a kilocycle pulse or one thousand pulses per second. The output of the triggering pulses occur at a lower rate depending upon the number of stages or steps in the ring counter, which for the function of controlling the transmission of triggering pulses acts as a frequency divider. For example, if the ring counter 16 has one hundred stages or steps, the triggering pulses will occur at the end of each one hundred clock pulses, or at ten cycles per second. Other frequencies and number of steps or stages may be used depending on the needs of any particular system. The present frequencies are given only as an example.

Leaving the monitoring station for the time being, reference is now made to FIGURE 3, which shows an example of a responder station. Each responder station is of the same construction and therefore a disclosure of one will suffice for all. The responder stations of FIGURE 3 differ from each other only in the time delay period produced by its delay means. In a given system it is desired that the reply pulses from the responder stations arrive at the monitoring station or stations in sequence and in spaced time slots. Each station responding to the triggering pulse from the monitor station will be provided with its own exclusive time delay period produced by its delay means. This thus provides the delay necessary for the reply pulses to arrive in definite time slots at the monitoring station.

The triggering pulses from the monitoring station are received at each responder station of the system at their individual antennas 21. When a group of responder stations are located in a group relatively close together, a single antenna may be used for the group of responder stations. Also, as will be disclosed, a single transmitter may in certain instances suffice for a plurality of transducers.

The antenna 21 is connected to a T/R box 22, similar to the T/R box 13 in the monitoring station, and through the T/R box 22 to the receiver 24. Normally the receiver is isolated from the antenna by the T/R box 22. However, during the interval that the triggering pulse is expected the T/R box 22 connects the receiver to the antenna. The incoming triggering pulse is amplified and otherwise modified as is usual in a receiver and produces a pulse output. This pulse output is fed to a single shot multivibrator 23, which produces a switching operation in the T/R box 22 to immediately disconnect the receiver from the antenna. At the same time the transmitter is connected to the antenna 21. The single shot multivibrator is so timed as to maintain the transmitter connected to the antenna for a period slightly less than the period between triggering pulses. Thus the receiver 24 is always connected to the antenna at the moment of the arrival of the expected triggering pulse.

The output of the receiver 24 is also connected to an AND gate 25, which controls the passage of the pulse, and through the gate means 25, a delay means 26 to a driver 27 which operates to trigger the transmitter 28. As previously stated, each responder station is provided with its own delay means that produces a delay period required to compel the reply pulse from the responder station to arrive at the monitoring station in the interval to cause it to fall within its own time slot.

The gate means 25 is normally closed in the absence of energy supplied thereto under the control of a transducer 33. As seen in the drawing, the gate 25 is supplied with energy for this purpose through the flip-flop 29. The flip-flop 29 is normally in its reset state and while in that state it provides an energy level to the gate 25 adequate to maintain it in its open state for the passage of the pulse from the receiver 24 to the delay means 26. When the flip-flop 29 is in its set state the energy level supplied to the gate 25 is below that necessary to maintain it in its open state.

The flip-flop 29 is controlled by the transducer 33. In the present example of the invention, the transducer 33 is connected to a threshold comparator 32 which is provided with a means 34 for selectively determining the threshold of operation of the transducer 33. The transducer 33 provides an energy level dependent upon the state of the condition to which it is responsive. So long as the energy level at the output of the transducer remains normal as dictated by the setting of the comparator 32 nothing happens to alter the open state of the gate 25. The output of the comparator 32 is connected to the Schmitt trigger 31, that has a built-in threshold of response. It operates to shift between its two states depending on the energy supplied to it, that is, whether it is above or below its threshold. In shifting between its two states, it produces a shaped pulse at its output, which is connected to the flip-flop 29. This output pulse from the Schmitt is effective upon the flip-flop 20 to flip it from its reset state to its set state to deactivate the gate 25, as by lowering or discontinuing the energy supply to the gate 25.

Thus, the transducer is arranged to produce an energy level which represents the normal state of the condition under surveillance. Should the state of the condition become abnormal or should the transducer fail to function of its own accord, the energy level to the comparator would cause an input to the Schmitt trigger causing it to cause the flip-flop to flip to its set state to close the gate 25 and prevent the passage of the triggering pulse to the driver 27. As a consequence, no reply pulse will be transmitted and this will produce an indication at the monitoring station that something is wrong at the responder station failing to reply to the trigger pulse.

The flip-flop 29 when once flipped to its set state will remain in that state until reset either by a manually controlled means or by automatically operable means. The present invention contemplates the use of either type of reset means. For the purpose of disclosure of the invention, an automatically operable means is disclosed. It is preferred that the flip-flop 29 be automatically reset prior to the receipt of the triggering pulse from the monitoring station. For this purpose, the input line 30 is connected to an inverter means 30A, which has its input connected to and controlled by the single shot multivibrator 23, as hereinbefore disclosed. The single shot multivibrator 23 responds to the output of the receiver 24 just subsequent to the reception of the trigger pulse to provide energy to the T/R box 22 to shift it to its transmit state. The single shot multivibrator 23 remains in this state to supply energy to the T/R box 22 for a period slightly less than the period between the triggering pulses. At the end of this period, because of its built-in time delay, it shifts to its opposite state to terminate the supply of energy to the T/R box 22 to cause the T/R box 22 to be shifted to its receive state. At this same instant, the absence of energy at the input of the inverter 30A produces a pulse output equal in duration to the period that the T/R box 22 is in its receive state. This output from the inverter 30A operates to cause the flip-flop 29 to be flipped to its reset state. Should the abnormal state of the condition persist at the transducer 33, the flip-flop 29 will immediately be flipped to its set state whereby the gate 25 will be closed to the passage of the pulse from the receiver 24.

In the instance where a manual reset means is utilized, an attendant from the monitoring station would be compelled to visit the responder station to investigate the cause of the abnormality and reset the flip-flop 29 when the abnormality has been cleared. In the instance of use of the automatically operable reset means, any momentary disruption of power supply which might cause an indication of an abnormality at the monitoring station would be cleared by the automatic reset means. However, should the disturbance persist, an attendant would still be required to visit the station to investigate the cause.

During the period that the T/R box 22 is in its transmit state, no triggering pulses from other sources or from other responder stations can be received to interfere with the proper operation of the individual responder stations.

Referring to FIGURE 1, the schematic drawing also shows a means for receiving the reply pulses from the various responder stations. Because the responder stations are set to respond, if at all, in a definite time interval, after the triggering pulse is received from the monitoring station the reply pulses from the responder stations will be received at the monitoring station each at a different time interval. By providing a delay means with the proper delay period at the responder stations the response pulses from the various responder stations can be arranged to arrive at the monitoring station in a predetermined sequential order. The monitoring station is provided with a plurality of channels or circuits, one each for each condition that is to be kept under surveillance, or one each for each reply pulse to be received. Each channel or circuit is equipped with means for producing an indication representing the presence and absence of the reply pulses in a given time interval or time slot. The indicating means in the present example is a visual means which is normally energized while the reply pulses are continually received and which is de-energized when a reply pulse fails to arrive. An audio alarm means is also provided which is energized when any one or more of the visual means is de-energized.

For accomplishing the above results, the monitoring station is provided with a receiver 14 for receiving the reply pulses from the various responder stations. As previously disclosed the receiver 14 is connected to the antenna by the T/R box 13 except for a short period during which the triggering pulses are being transmitted, therefore it is ready for the reception of the response pulse immediately after the broadcast of the triggering pulses.

The receiver 14 is connected to the flip-flop 2 as is also the clock output. The clock pulse operates to flip the flip-flop 2 from the reset state to its set state and cause the driver 4 to provide energy over conductor 20A to alert all of the gates 5. A delay means 3 is connected between the flip-flop 2 and the driver 4 for the purpose of delaying the energization of line 20A for a short interval so that it will not occur coincidently with the clock pulse. The AND gates 5 to be conductive must be energized coincidently at all three of their input terminals. On the input terminals on each gate 5 is energized from line 20A. Another terminal to the gates 5 is energized directly from the clock over line 20. The third input terminal of the gate 5 is energized from the clock 1 through the commutator means or ring counter 16. This latter connection is commutated by the ring counter 16 from one gate 5 to the next in step with the clock pulses, such that through the latter connection only one gate is connected to the clock 1 at any time. The terminals connected to line 20 and those commutated by the ring counter 16 are energized coincidently whereas because of the delay means 3 the other terminal is not coincidently energized.

The flip-flop 2, as previously stated, is flipped to its set state at which energy is supplied to line 20A, but not until after the termination of the clock pulse. The flip-flop 2 is arranged to be flipped to its reset state to terminate the energy on line 20A, prior to the arrival of the next or subsequent clock pulse. For this purpose, the output of the receiver 14 is connected to the flip-flop 2 and because the reply pulses arrived in the interval between clock pulses, they operate to flip the flip-flop 2 to its reset state to discontinue the energy on line 20A. It is obvious then, that so long as reply pulses are received line 20A will always be de-energized at the instant clock pulses are applied to the second and third terminals of the gates 5. However, should there be an absence of response from any responder station in the interval of its expected response, there would be no flipping of the flip-flop 2 to its reset state and line 20A would continue to be energized through the subsequent clock period, providing a condition for coincidence of input to all input terminals of one of the gates 5. The gate 5 at which this condition exists is determined by the circuit or channel commutated at the instant. This operation is more clearly demonstrated when traces (a) and (b) of FIGURE 2 are compared. The periods for the pulses at the output of the driver 4 and on line 20A begin after each clock pulse and terminate prior to the subsequent clock pulse. When there is no reply pulse at the receiver the period of the driver pulse or pulse on line 20A extends for a longer period than one clock period. Since the timing of the clock pulses represent the timing of the pulses on the second and third input terminals of the gates 5, it is evident that on at least one gate 5 there will be a coincidence of input energy on each of the input terminals.

From the above it is seen that the commutator device 16 limits the gates 5 to sequential response, whereas the flip-flop 2 has the effect of limiting the response of the gates to an absence of an incoming response pulse from the responder stations. So long as a response pulse is received the flip-flops 2 will be returned to its reset state prior to the subsequent clock pulse. As a consequence, there will be no coincidence of the energy on the three terminals of the gates 5 so long as the reply pulses are received from the responder stations.

The flip-flops 6 are connected to gates 5 and while in the reset state they operate to energize the visual indicator, indicating a normal state of conditions at the responder stations. When there is no response pulse from the responder stations, the circuit then commutated will be energized through its gate 5 and the flip-flop 6 will be flipped to its set state to cause the circuit to be de-energized and cause the visual means to be de-energized. This indicates an abnormal state of condition or a malfunction at the responder station failing to respond.

The channels or circuits for the indication includes a lamp 7 connected to the flip-flops 6. The visual indicator may if desired be of the annunciator type or any other type. The lamp 7 is only shown as an example of one form of a visual indicator.

Each of the flip-flops 6 are also connected to an audio alarm means as represented by the transformer 10 and its associated bell. In the present arrangement, there is a circuit from each flip-flop 6 to a NOR gate 8 connected through a driver 9 to the transformer 10. So long as all the inputs to the NOR gate 8 are energized there will be no output at the NOR gate. In each of the circuits is a switch means 19 whereby the alarm may be silenced. In this arrangement, so long as there is energy on all of the visual indicator lines, there will be energy on all the input terminals of the NOR gate 8. At the same time there will be no output to the driver 9 and no energy will be supplied to the transformer 10 and its bell. However, should any visual indicator line become de-energized by its flip-flop 6 one of the circuits to the NOR gate 8 will be de-energized and an output will appear at the output terminal of the NOR gate 8 to cause the driver to energize the transformer 10 and sound the alarm. To silence the alarm prior to correction of the abnormality that caused it to sound, the switches 19 are arranged as double throw switches which when thrown to their opposite position will connect the input of the NOR gate 8 to a source of energy, represented by line 19A.

The switches 19 are arranged to disconnect the NOR gate 8 from the visual indicator lines whereby the alarm itself may be tested.

The commutator or ring counter 16 also has an input controlled by switch 15 for the purpose of clearing and resetting the counter at any time that may be required, as for example when the system is initially placed in operation.

The flip-flops 6 when once flipped to its set state will remain in that state until flipped to its reset state. For flipping the flip-flops 6 to the reset state inputs thereto are provided having manually operable swiches 18. The source of energy for accomplishing this purpose may be connected to all of the flip-flops 6.

The basic monitoring station shown in FIGURE 1, also includes an additional feature. This feature is for indicating when someone is broadcasting random pulses to cause an indication of normality when such condition does not exist, as in the instance when the system is to detect intruders. For this purpose an extra gate and indicating circuit beyond that required by the systems responder stations is included. This extra gate and extra circuit is connected in the same manner as the other circuits. In fact, any one of the extra gates and circuits that may be provided beyond requirements to allow for expansion may be used for the above purpose. This extra circuit has no responder station to produce a reply pulse. As a consequence, under normal conditions, its visual indicator would be de-energized. This condition can be the normal condition for the purpose. To prevent the alarm from being sounded its switch 19 can be maintained in the position to constantly supply energy to the NOR gate 8. Now when someone broadcasts random pulses in an attempt to rig the system and a pulse or pulses falls with the time slot allocated to the extra circuit the visual indicator which normally is de-energized will be energized to indicate the presence of random pulses. This will alert the attendants at the monitoring station to this fact. As has been stated no modification of the basic station is required to enjoy this additional advantage. The only need, which is usually provided to allow for addition to the system is that an extra gate and circuit be available and not allocated to a responder station.

FIGURE 2 previously referred to, discloses the relationship between the pulses and the supply of energy in the various circuits of the monitoring station and helps to make clear its mode of operation. The clock emits pulses (trace *a*) which is shown as continually reoccurring at regular intervals. The driver 4 because of the delay means 3 produces energy to line 20A (illustrated in trace *b*) which persists from the instant it is turned on until the response signal turns it off prior to the reception of the next clock pulse. This trace is shown with an extra long energy pulse occurring between the second and fourth clock pulse. This illustrates the absence of a response signal from one of the responder stations as evidenced by trace *c* wherein no response pulse is shown between the second and third clock pulses. As a consequence of the long trace indicating a long pulse duration (trace *b*) when the third clock pulse occurs there will be a coincidence of the inputs to a gate 5, which at that instant is commutated by the ring counter 16.

The trace *d* illustrates a typical spacing of the triggering pulses with respect to the clock pulses. The trace *e* shows an energy input to the T/R box 13 occurring during the transmission of the triggering pulse. The trace *f* illustrates the operation of the ring counter 16 under the control of the clock 1 producing positive and negative going variations in timed relation with the clock pulses, which is effective in the ring counter to step it from one stage to the next. Traces *g* and *h* disclose the variations in the visual and alarm circuits with the absence of a response pulse as represented by trace *c*.

The system as above disclosed is by no means restricted to the use of electromagnetic emanations being transmitted over the air. This same type of emanations may be transmitted over a system of single conductor using ground return. It is contemplated that the system may, if desired, utilize a wired system or a combination of a wired system and a wireless system. Still further, more than one monitoring station may be used, as for example in instances where one is located in a plant complex operated by and attended by the plant guard and one is located in a police station, firehouse or offices of a security organization. In this instance the monitoring can be done at any of the monitoring stations or simultaneous at all of the monitoring stations. All that is required for simultaneous monitoring is that means be provided for synchronizing the clocks of the various monitoring stations so that they will simultaneously produce the triggering pulses. This can be done easily by using one monitoring station as a master station and all the other stations as slave stations. The simultaneous broadcast of triggering pulses is not necessary except from the master station. The broadcast of the triggering pulses from the slave stations can, if desired, be interrupted by disabling the transmitter of the slave stations as by turning off its power supply. The synchronism of the clock is necessary for the synchronous stepping of the commutator means.

Such arrangement is illustrated in FIG. 4 and FIG. 1. In FIG. 4 the system is shown as provided with a plurality of monitoring stations 41 and 42 and responder stations 46 and 47. The monitoring station 42 provides a pulse source for triggering the responder stations 46 connected to the monitoring station 42 by a single conductor 48. It also sends out a triggering pulse via the antenna 44 to the more remote responder stations 47, each of which having their own antenna 49 and which respond over the air to the monitoring station 42. An arrangement of this character may be used in a situation where some of the responder stations are in a given building the same in which the monitoring station 42 is located and where other responder stations are more remote as in different buildings of the plant complex. The monitoring station in this instance would function the same as the monitoring station shown in FIGURE 1, with the exception that it would transmit over both the wired system and via the antenna. No alteration of the system is required for this purpose.

FIGURE 4 also discloses one additional monitoring station 41 provided with an antenna 43 which is the same in character as that shown in FIGURE 1. The pulses sent out by this monitoring station 41 can be picked up by the responder stations 47 and the responder stations 46 via the antenna 44. Either monitoring station may be used for sending out the triggering pulses or they may both be used for sending out the triggering pulses as above mentioned. Provisions are made in FIGURE 1 for operation of any one of the monitoring stations as the master station and all the others as slave stations.

Referring to FIGURE 1, the received triggering pulse from one monitoring station is connected to and through a switch 51 to a synchronizor device 50, which in turn is connected to the clock 1. When the switch 51 is closed and the transmitter 11 is disabled at the slave station, the triggering pulses from the master stations will cause the clock at the slave stations to run in synchronism with the clock in the master station. The pulses received from the responder stations will then be effective in the corresponding indicator channels at the master and slave stations. When separate operation is desired the switch 51 is opened and the non-used monitoring stations are shut down. In some instances it may be desired to have all monitoring stations broadcast triggering pulses, as for example when the stations are widely scattered and some responder stations will be within the range of one monitoring station but not of others. In this instance the transmitter of the slave stations are not disabled by removal of their power supply. As shown in FIGURE 1, my system is adaptable without modification to its essential features to many different conditions and situations that make it exceptionally desirable.

As hereinbefore mentioned, there may be certain circumstances where it is desirable or when it is necessary to monitor a plurality of conditions all having the same environment and location. In such instance, instead of providing a responder for each condition, a single responder station can be made to respond with a plurality of spaced pulses through a single transmitter. FIGURE 5 discloses a modified responder station having a plurality of transducers arranged to control a transmitter so that any one of the plurality of response pulses will or will not be transmitted in accordance with the state of a condition existing at the transducers.

The responder station includes the usual antenna 21 connected through a T/R box 52 to a receiver 53 for receiving the triggering pulses from the monitoring station, and a transmitter 71 for transmitting the response pulses. The T/R box is also connected to the output of the receiver 53 through the single shot multivibrator 58 for controlling the T/R box 52 as in the first embodiment of the invention. However, instead of a single gate means and single delay means connecting receiver and the driver as in the first embodiment, this embodiment provides a plurality of parallel circuits between the receiver 53 and the driver 68 over which the triggering pulse is transmitted. Each circuit includes a gate device 59–62 and a delay means 63–66. The delay means 63–66 as illustrated by their different lengths are arranged to have different delay periods, whereby the pulse from the receiver entering therein through their respective gate means will produce a plurality of pulses to the driver for triggering the transmitter to emit a plurality of pulses for each triggering pulse received from the monitoring station. The pulses will arrive at the monitoring stations in the same sequential order as if they were all from a plurality of stations. As shown, each gate is controlled by its own individual flip-flop 29 actuated by a Schmitt trigger 31, in response to the output from the comparator 32 as dictated by the conditions prevailing at the transducers 33.

The mode of operation of this embodiment is the same as that described in relation to the first embodiment of FIGURE 3, except, that it produces the number of responses required to indicate the plurality of conditions under serveillance at the responder station. Also in this instance, the flip-flops 29 may be provided with manually operable reset means, or automatically operable reset means.

Various other modifications of the invention will also be obvious to one considering this disclosure. It is not my intention to be limited to the examples given except as set forth in the appended claims.

My invention as herein disclosed fulfills the needs herein stated. It cannot be easily rigged to respond in a normal manner when abnormal conditions prevail at the transducers. Rigging is usually attempted to nullify the operation of those systems used to detect the presence of an intruder in a given space. Since all external connections between responders and monitors are by wireless means, there are no lines that may be tapped. Since the time period is allocated for response, it would be difficult for the response pattern to be duplicated. Any attempt to randomly broadcast response pulses would as has been disclosed be immediately detected at the monitoring station.

The system has an inherent fail safe feature, since a failure of any of the components in the responder stations would also cause an omission of the rely pulse and call for the same attention as an abnormal state of the condition under surveillance. Failure of components in the monitoring station would also prevent the continual energization of the indicator circuits and thus produce the same indication.

To expand the system only requires that additional transponder or responder stations be added and that the monitoring station possess the requisite number of steps or stages in the commutator device. No alteration of the system is required.

The system makes use of the same frequency for triggering and for response and thus does not waste the frequency band allocated for such services. Increasing the number of stations served does not add to the frequency requirements. The system is adaptable to use of the light and power wiring system by use of coupling capacitors that will pass the high frequency carrier of the system but would isolate the power and light frequencies, thus saving on expensive wiring systems.

Any malfunctioning component can easily be replaced thus making it possible for the system to be maintained continually in service.

These and other advantages are present in the present system which make the system useful and desirable. What I desire to patent is set forth in the following claims:

1. A monitoring system comprising:
    a first means for transmitting triggering pulses at equal timed intervals and for receiving reply pulses;
    responder means for receiving said triggering pulses and for transmitting reply pulses in response to said triggering pulses;
    means associated with said responder means responsive to conditions under surveillance operable to prevent the transmission of said reply pulses when an abnormality exists in said conditions;
    and means for providing a separate time delay in the transmission of said reply pulses for each condition under surveillance to cause said reply pulses to be transmitted in timed sequence and in separate time intervals;

means at said first means providing a separate energized indicating channel for each of said conditions; and means associated with said first means operable in response to the absence of a reply pulse in any time interval, to de-energize the channel allocated for that reply pulse, to thereby indicate at the first means the abnormality of said conditionns.

2. A monitoring system as set forth in claim 1 wherein said first means comprises:

a plurality of indicating circuits, each having a visual indicating means;

controllable means connected to said circuits for normally maintaining said circuits energized;

gate means for each indicating circuit to cause said controllable means to de-enrgize said circuits when said gates are activated;

a recycling commutator means having separate stages connected to the separate gate means to time the activation of the gates to the time intervals of arrival of the reply pulses;

means also connected to said commutator for triggering said means for transmitting pulses, once every cycle of said commutator means;

clock means producing high frequency pulses connected to said commutating means for stepping it through its stages and for energizing the gate commutated;

a circuit connected to another terminal of said gate means;

means connected to said clock and including a delay device for energizing said circuit after the conclusion of each clock pulse; and means connecting the means for receiving said reply pulses to the last named means for causing it to de-energize said circuit each time a reply pulse is received, whereby a commutated gate means will be activated only when no reply pulse is received in any allocated time interval for response.

3. A monitoring system as set forth in claim 1, wherein said first means comprises;

a plurality of monitoring stations any of which may be used to transmit and receive reply pulses from the responder means;

synchronizing means for synchronizing the operation of the separate monitoring stations; and means selectively operable at each monitoring station for disabling said synchronizing means therein, whereby said station may be utilized as a master monitoring station and the remaining monitoring stations would operate as slave stations.

4. A monitoring system comprising:

a monitoring station and a plurality of responder stations, said monitoring station having means for transmitting time spaced triggering pulses; and means for receiving reply pulses from said responder stations;

said responder stations having means for receiving said triggering pulses;

means responsive to said triggering pulses for transmitting reply pulses;

means responsive to conditions under surveillance when an abnormality exists operable for preventing transmission of said reply pulses; and delay means for producing a predetermined time delay between the reception of said triggering pulses and the transmission of the reply pulses, the delay means at each responder station producing a different delay period for each reply pulse;

said monitoring station having further means for providing separate indicating channels, one allocated for each reply pulse; and means responsive to the absence of reply pulses operable to produce an indication in the channel allocated to the expected reply pulse.

5. A monitoring system as set forth in claim 4 further comprising:

means in said monitoring station for conditioning said station to transmit triggering pulses during a period slightly longer than the duration of the triggering pulses and for conditioning said station to receive reply pulses for a period slightly less than the period between said triggering pulses; and said responder stations further comprising means for conditioning said responder stations to receive said triggering pulses during a period slightly longer than the duration of said triggering pulses and for conditioning said responder stations for transmission of reply pulses for a period slightly less than the period between triggering pulses, whereby said monitoring station will be conditioned to receive said reply pulses for a substantial period betwen triggering pulses and the responder station will be conditioned to exclude the reception of pulses for a substantial period between triggering pulses.

6. A monitoring system as set forth in claim 4, wherein said monitoring station includes means for providing separate indicating channels each of which are electrical circuits, including:

a gate means for controlling said circuits;

a means under the control of said gates to normally maintain said circuits energized as long as reply pulses are being received; and means operable in step with time intervals of expected arrival of reply pulses to commutate said gates; and the means responsive to the absence of reply pulses further includes:

means for activating said gates when commutated, to cause said circuits to be de-energized when no reply pulse is received.

7. A monitoring system as set forth in claim 4, wherein said responder stations include means responsive to conditions under surveillance and wherein it includes:

gate means between said receiver and said transmitter to control the transmission of triggering pulses from the receiver to the transmitter; and transducer means responsive to changes in said conditions to control said gate means and interrupt the transmission of said triggering pulses when an abnormality exists.

8. A monitoring system as set forth in claim 4 wherein said means responsive to conditions under surveillance comprises:

a plurality of parallel circuits connecting said means for receiving said triggering pulses and said means responsive to said triggering pulses for transmitting reply pulses;

a gate means for controlling each of said parallel circuits; and separate transducer means for each parallel circuit for controlling the gates therein operable to prevent the transmission of the triggering pulse in any circuit in response to an abnormal condition at its transducer;

wherein said delay means, comprises:

a plurality of delay devices, one each in each parallel circuit, arranged to provide a different relay period for each parallel circuit, whereby the triggering pulse as transmitted in the separate parallel circuits will cause said means for transmitting reply pulses to transmit separate time spaced pulses in response to each triggering pulse received at the responder station.

9. A monitoring system as set forth in claim 4 wherein said means for transmitting time spaced triggering pulses comprises:

a clock means operable to produce pulses at high frequency;

a divider means to divide said high frequency and produce a lower frequency having a period between pulses of that of the desired triggering pulses; said divider means being connected to said clock means;

a driver means connected to said divider means for amplifying the output of said divider means;

a transmitter connected to said driver means and triggered into activity for the duration of the output of said driver means thereby to produce a pulse of radio frequency energy and a pulse frequency equal to the output of said divider means;

an antenna; and means connecting said transmitter to said antenna for the duration of the output of said transmitter.

10. A monitoring system as set forth in claim 9, wherein said means connecting said transmitter to said antenna for the duration of the output of said transmitter comprises:

a transmit-receive switching device connected between said transmitter and said antenna and normally maintained in its receive state; and flip-flop means also connected to the output of said divider means to receive triggering pulses therefrom and to energize said transmit-receive switching device to cause it to be shifted to its transmitting state for a period at least equal to the duration of said transmitter output, where said transmitter is connected to said antenna substantially only while the triggering pulse is being emitted by said transmitter.

References Cited

UNITED STATES PATENTS

| | | | |
|---|---|---|---|
| 2,530,096 | 11/1950 | Sudman | 343—6.8 |
| 2,923,935 | 2/1960 | Sinclair et al. | 343—6.8 X |
| 3,142,836 | 7/1964 | Ambrose | 343—6.8 |
| 3,341,845 | 9/1967 | Deman | 343—6.8 X |

RODNEY D. BENNETT, JR., Primary Examiner

M. F. HUBLER, Assistant Examiner

U.S. Cl. X.R.

340—408; 343—6.8